4 Sheets—Sheet 1.

L. TOWNE,

Assignor, by mesne assignments, to AMERICAN HOOK AND BUTTON COMPANY.

MACHINE FOR MAKING BUTTON HOOKS.

No. 9,837. Reissued Aug. 9, 1881.

WITNESSES:

J. A. Miller Jr.

Wm. L. Roop

INVENTOR:

Lauriston Towne by Joseph A. Miller atty

4 Sheets—Sheet 2.

L. TOWNE,

Assignor, by mesne assignments, to AMERICAN HOOK AND BUTTON COMPANY.

MACHINE FOR MAKING BUTTON HOOKS.

No. 9,837. Reissued Aug. 9, 1881.

WITNESSES:

J. A. Miller Jr.

Wm. L. Cooper

INVENTOR:

Lauriston Towne by Joseph A. Miller Atty

L. TOWNE,

Assignor, by mesne assignments, to AMERICAN HOOK AND BUTTON COMPANY.

MACHINE FOR MAKING BUTTON HOOKS.

No. 9,837. Reissued Aug. 9, 1881.

WITNESSES:

J. A. Miller Jr.

Wm. L. Bof.

INVENTOR:

Lauriston Towne by Joseph A. Miller Atty

4 Sheets—Sheet 4.
L. TOWNE,
Assignor, by mesne assignments, to AMERICAN HOOK AND BUTTON COMPANY.
MACHINE FOR MAKING BUTTON HOOKS.
No. 9,837. Reissued Aug. 9, 1881.
Fig. 6.
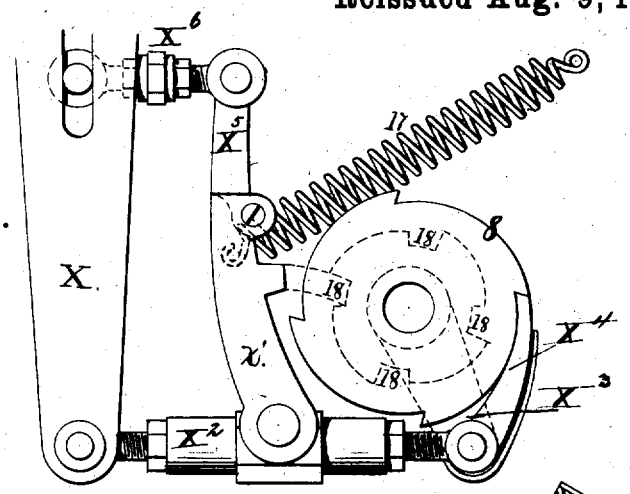
Fig. 7.
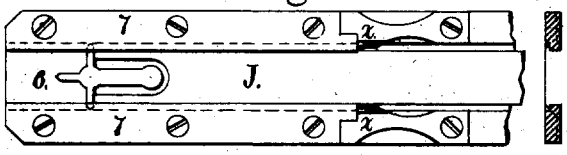
Fig. 9.
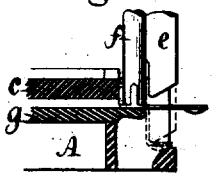
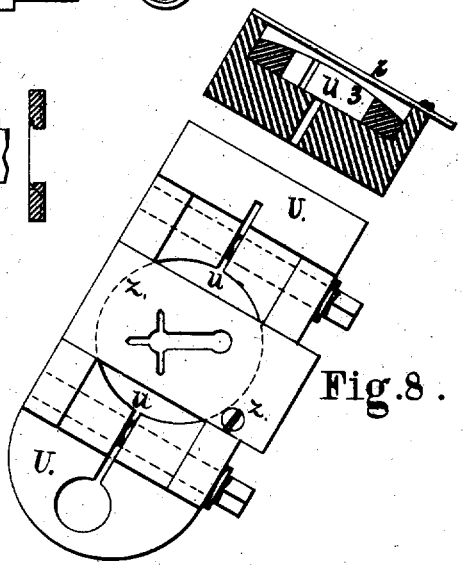
Fig. 8.
Fig. 10.
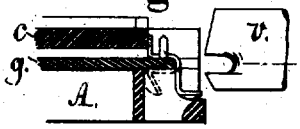
Fig. 11.
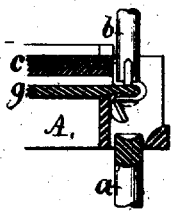
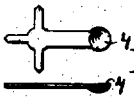
No. 1. No. 3.
No. 2. No. 4.
WITNESSES:
J. A. Miller Jr.
Wm. L. Cooper
INVENTOR:
Lawriston Towne
by Joseph A. Miller atty

UNITED STATES PATENT OFFICE.

LAURISTON TOWNE, OF PROVIDENCE, RHODE ISLAND, ASSIGNOR, BY MESNE ASSIGNMENTS, TO AMERICAN HOOK AND BUTTON COMPANY.

MACHINE FOR MAKING BUTTON-HOOKS.

SPECIFICATION forming part of Reissued Letters Patent No. 9,837, dated August 9, 1881.

Original No. 86,473, dated February 2, 1869. Application for reissue filed August 2, 1880.

*To all whom it may concern:*

Be it known that I, LAURISTON TOWNE, of the city and county of Providence, in the State of Rhode Island, have invented a new and Improved Machine for Making Button-Hooks; and I do hereby declare that the following specification, taken in connection with the drawings making a part of the same, is a full, clear, and exact description thereof.

Figure 1:
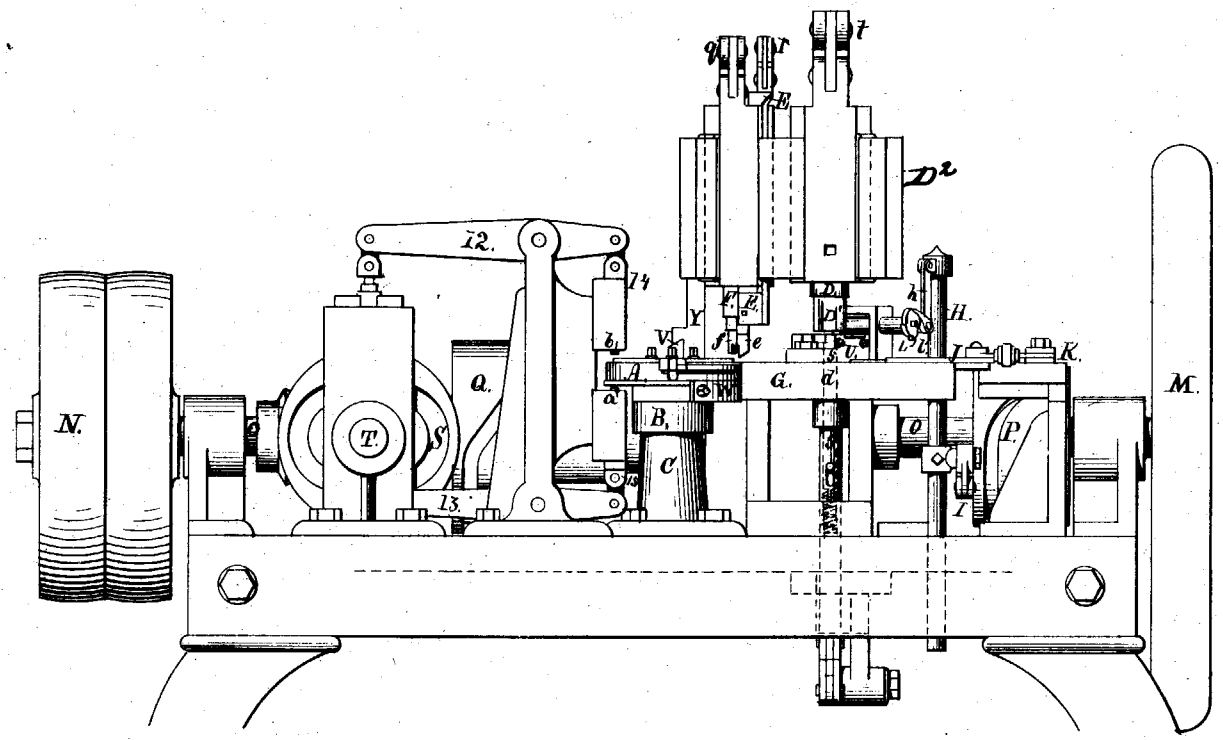
Figure 2:
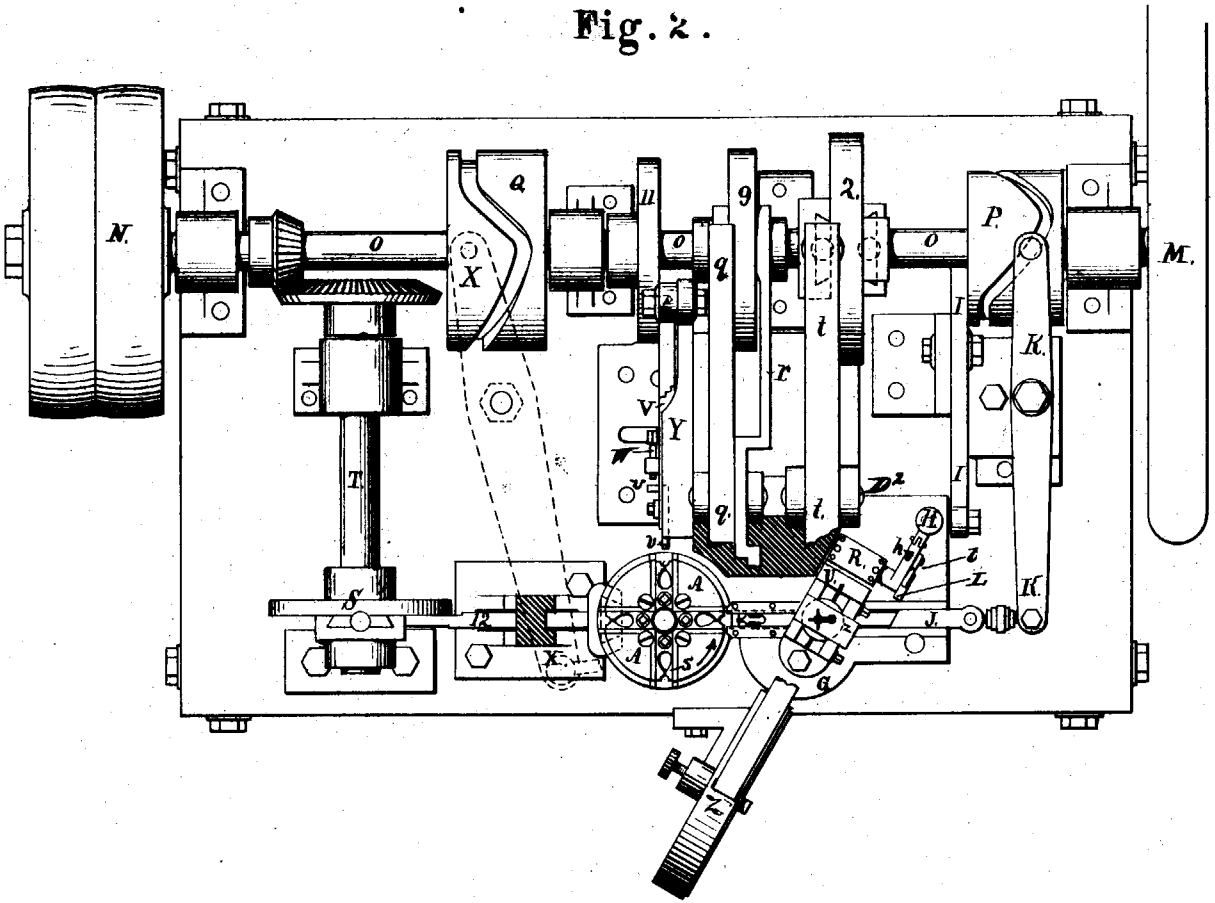
Figure 3:
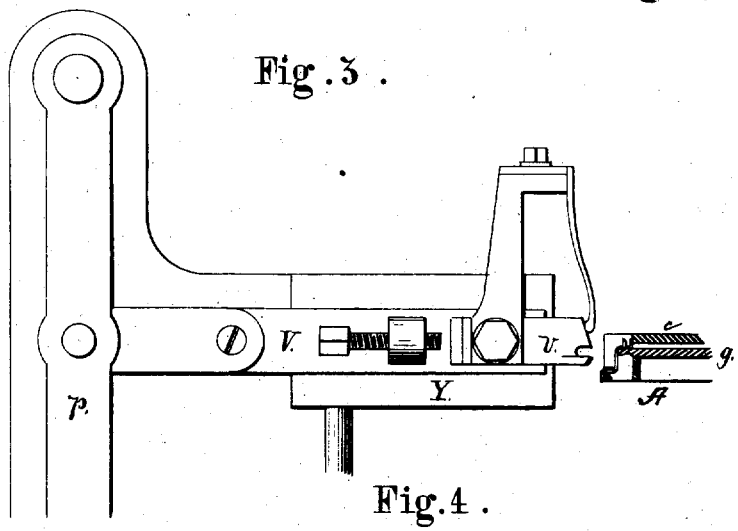

Figure 1 is a side view. Fig. 2 is a plan. Figs. 3 to 11, inclusive, are detailed parts to be referred to. Nos. 1 to 4, inclusive, exhibit articles made progressively by the machine from the blank to the button-hook.

The same letters indicate corresponding parts in all the figures.

The machine herein described is especially designed to make the article used in place of eyelets for holding the lacings of shoes and gaiters, known as a "combined hook and button," and for which article of manufacture Letters Patent of the United States were granted to William H. Shurtleff, bearing date June 5, A. D. 1866.

The principles of construction which the machine exhibits can also, with suitable modification of the forms of the cutters and dies, be made available for the production of various articles made from sheet metal, which require to be swaged by successive operations into a particular shape.

The blank upon which the present machine is intended to operate in order to produce the special article of manufacture named is shown at sketch No. 1. Before being brought to the finished shape shown at No. 4 it is necessary that it should pass successively through the forms shown at Nos. 2 and 3.

The moving parts of the machine are all operated from a continuously-rotating main shaft, O, carrying a fly-wheel, M, and a fast pulley, N, for driving it by means of a belt, a loose pulley being also arranged on the shaft alongside the fast pulley, as usual.

The machine cuts its own blanks from a metallic ribbon, which may be fed to it by any convenient means. I prefer to wind the ribbon into a coil, inclose it in a box, Z, Fig. 2, like a barrel for the mainspring of a watch, with the exception that a transverse slit is cut through the side of such box for the passage of the strip of metal. A pair of feeding-rollers, R, Fig. 2, operated by an intermittent pawl-and-ratchet feed, *l* L, nips the ribbon of metal and feeds it along at the rate required to present a fresh surface of such ribbon to the face of the stamping-punch, which cuts out a blank each time that it descends. The pawl *l* is pivoted on a loose arm on the shaft of ratchet-wheel L, the arm being connected by a link, *h*, to a vertical rod, H, which is reciprocated intermittingly by a lever, I, operated by cam P on the main shaft O. In this respect the arrangement is like that employed by me in feeding a similar ribbon to the machine for making sheet-metal chain heretofore patented to me.

The first operation of the machine is to cut from the metallic ribbon a blank, No. 1. This is performed by the stamping-punch D′, (whose face is of the same size and outline as that of the blank,) co-operating with a die, *u*, in which an opening, 3, is formed corresponding with the cross-sectional contour of the stamping-punch. The stamping-punch is fixed to the lower end of a stock, D, fitted in vertical guides on the head $D^2$ of the main frame. The stock D and stamping-punch D′ are reciprocated by means of a lever, *t*, fulcrumed on the head, one arm being linked to the stock D and the other arm being linked to a vertically-moving slide operated by cam 2 on the main shaft O, in a well-understood way. The die *u* is clamped in the block U, (fixed on the main frame,) below the plate *z*, between which plate and the die the metallic ribbon passes through the feeding-rollers, the plate *z* having a suitable opening cut through it for the play of the stamping-punch D′. (See Fig. 8.) The cross-sectional view, Fig. 8, is taken at different planes through the block U and die *u*, so as to show one of the split ends of the block in section at a plane beyond the plane of section of die *u*, the opening through the block U under the die *u* being consequently not visible in said cross-section. In descending the first action of the stamping-punch D′ is to stamp a dome, 4, No. 1, on the metallic ribbon. This is effected by a dome-shaped protuberance (not shown in the drawings) on the face of the stamping-punch coacting with the circular end of the opening 3 of die *u*, into which the said dome-shaped protuberance presses the metal before it severs it. Continuing its descent, the stamping-punch severs the blank No. 1 in conjunction with the die *u*, forcing the severed blank down through said die.

In stamping the blank the metal is yieldingly pressed against the flat portion of the face of the stamping-punch by a spring-presser, *d*, fitted in a plunger, 5, Fig. 1, which plunger is reciprocated by means of a cam on the main shaft O acting through a lever underneath the bed of the machine, the mechanism being similar to that for operating the stamping-punch. The plunger 5 moves upward as the stamping-punch moves downward, their movements being so timed that by the time the end of the stamping-punch touches the upper side of the metallic ribbon the spring-presser *d* of said plunger will touch its under side and press it firmly, though yieldingly, up against the stamping-punch. The continuing descent of the stamping-punch forces the spring-presser down, and by the time the blank is cut plunger 5 also begins its descent.

The stamped blank No. 1 is carried down by the descending stamping-punch and spring-presser *d* and deposited upon a way, 6, with its lateral prongs between a pair of pivoted spring-gripers, *x x*. These gripers have beveled overhanging lips, which are pressed upon by the descending blank, so as to open the gripers and permit the prongs of the blank to reach a level just below these overhanging lips as the stamping-punch completes its downstroke. On the upstroke of the stamping-punch the blank is stripped therefrom by the gripers and left on the way 6, held by said gripers directly in front of the follower J, fitted to slide on the way 6, between guides 7 7 thereof. The front end of the follower is shaped, as best shown in Fig. 7, so as to embrace the blank with its ends touching the lateral prongs thereof. Upon the instant that the stamping-punch commences to rise the follower J is caused to push the blank forward by the action of the cam P on the main shaft O through the intervention of the lever K, whose forward end is connected by a link with the rear end of the follower.

The stamped blank No. 1 is to be shaped by successive operations on an intermittingly-rotating table, A, fixed to a vertical spindle mounted in the fixed standard C of the main frame. The mechanism for intermittingly rotating the table is so contrived that during each complete rotation the table shall have four intervals of rest. On the lower end of the spindle of the table a ratchet-wheel, 8, with four teeth, is keyed, provided with a hub having four notches, 18. The ratchet-wheel 8 is operated by a pawl, $X^4$, pivoted to an arm, $X^3$, which turns loosely on the spindle of table A, and is connected by a link, $X^2$, to the long arm of the lever X, which is oscillated by cam Q on the main shaft O, so as to turn the ratchet-wheel quarter of a revolution at each oscillation of lever X. A dog, X′, pivoted to the link $X^2$, locks the ratchet-wheel by engaging one or the other of the notches 18 in its hub, and thus holds the table A steady during each interval of rest. The dog is actuated by a spring, 17, to engage the hub of the ratchet-wheel, and is disengaged just as the pawl $X^4$ is about to engage the next tooth of ratchet-wheel 8, preparatory to moving it a quarter-turn, by lever X through the intervention of a link, $X^6$, and a lever-arm, $X^5$, pivoted by a rule-joint to the outer end of the dog X′.

Four radial recesses are formed in the table A, which are brought successively into line with way 6. In each of these recesses is seated a plate, *c*, the several plates being rigidly held in place by the heads of the screws *i* entering recesses in the edges of said plates. The face of the plates *c* occupies the same level as way 6, so that the blank No. 1 can be pushed from way 6 onto the plate *c* at the time in line therewith. The outer end of each plate *c* is forked in such manner that when blank No. 1 is pushed onto it its prongs alone shall rest on solid portions of the said plate. The forked outer end of plate *c* forms a female die, through which a plunger, presently to be described, can press the body of the blank, while the prongs thereof are at the same time drawn up by the solid portions of said female die. A plate terminating at its outer end in spring-jaws *s s* is secured by screw *j* upon the top of each plate *c*. As blank No. 1 is pushed onto plate *c* its front prong enters between the spring-jaws *s s* and is grasped thereby.

Figure 4:
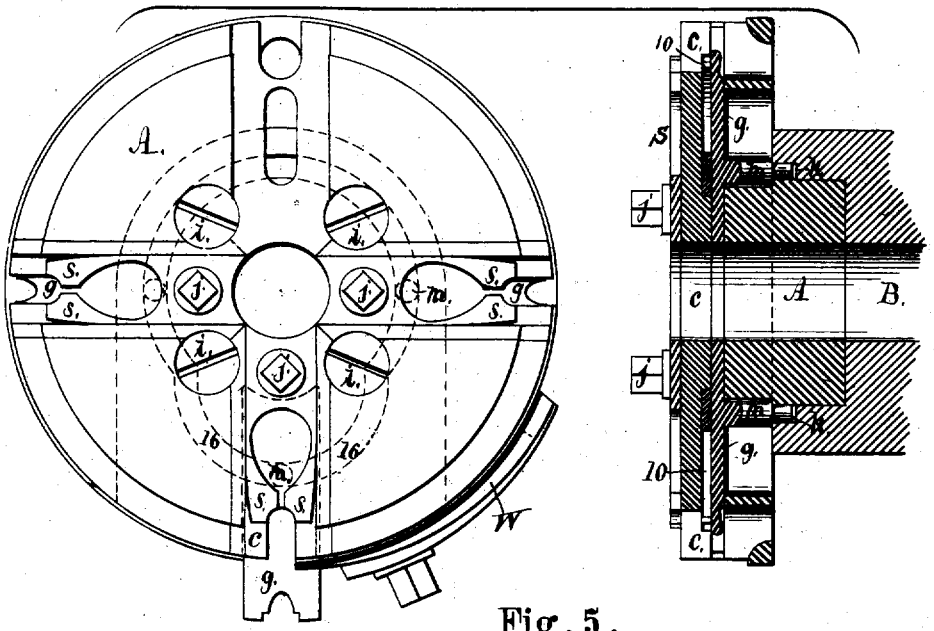
Figure 5:
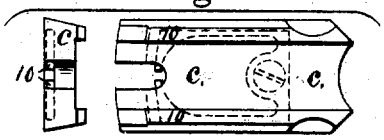

In each radial recess of table A, and below the plate *c*, is also fitted a radially-sliding plate, *g*, the outer end of which is formed as best shown in Figs. 4, 9, and 11. A stud, *m k*, projects downward from this plate *g* through a radial slot in table A, entering with its end *k* a camway, 16, in the top of a collar, B, secured to the standard C. During the greater portion of each rotation of table A the plates *g* are held projected by the camway to the extent shown in Figs. 3, 9, 10, 11, and cross-sectional Fig. 4, so that their outer ends project some distance under the opening of the fork of plate *c*. The sliding plates *g* occupy this position when they are opposite way 6, and from that time on up to the end of the second interval of rest thereafter.

Let it be supposed, now, that a blank No. 1 has been pushed onto a plate *c* of table A by the follower J, and left there with its front prong griped by the spring-jaws *s s*. Immediately on the recession of the follower J two plungers, *f* and *e*, attached respectively to the stocks F and E, descend, being actuated by camways in the respective sides of a disk, 9, on main shaft O, through the intervention of levers *q* and *r* and suitable connections. The plungers move together, so as to press the body of the blank flatwise down through the fork or female die of plate *c*, causing the prongs of the blank to be drawn up at right angles to the body of the blank. The moment the body of the blank reaches and is pressed upon the plate *g* the plunger *f* ceases its descent, and remains stationary, so as to firmly press the pronged end of the blank upon the plate *g*; but the plunger *e* continues its descent, bending the shank of the blank at a right angle down past the end of the plate *g*, and in so bending it the dome-shaped end of the blank strikes a lip on table A and is bent at a right angle to the shank, all as shown by broken lines in Fig. 9, the result being the blank No. 2. By the operation of plunger *f* the front prong of the blank is drawn from between the spring-jaws *s s* and forced between another pair of spring-jaws, 10, fixed to the bottom of plate *c*. The blank having been thus bent and griped, the plungers *f* and *e* are caused to ascend to clear the top of table A, which is immediately moved around a quarter-turn in the direction of the arrow in Fig. 2, so as to carry the blank No. 2 to a point opposite the horizontally-reciprocating plunger V, carrying a presser, *v*, another plate *c* being at the same time carried into line with way 6, ready to receive a fresh blank No. 1 from the follower J.

During the interval of rest of the table A the presser *v* is caused to advance by the cam 11 on the main shaft through the intervention of lever *p*, linked to the rear end of the plunger V. The forward end of presser *v* is forked, as shown best in Figs. 3 and 10, so that the upper prong thereof can slide over the flat portion of the blank on the top of plate *g*, while the lower prong bends the shank of the blank around the end of plate *g* and the connecting-web of the prongs presses the shank into the concavity in the end of the plate *g*, so as to transversely curve or corrugate the shank, in the manner shown in the Shurtleff patent hereinbefore referred to. In thus bending the blank around the plate *g* (which, so far as its passive action here is concerned, may be termed the "former," because the blank is formed around it) the dome-shaped end thereof strikes the edge of table A, causing such dome-shaped end to be slightly bent back, as shown in Figs. 10 and 11. Thus by the operation of presser *v* the blank is shaped to the form of No. 3. The presser *v* now recedes, and the table A is moved another quarter-turn, so as to carry blank No. 3 to a point between the presser-bar *b* and the dome-bending plunger *a*. The presser-bar *b* is caused to descend from above the table to press the flat and pronged end of the blank down upon the former *g*, and the plunger *a* is caused to ascend from below the table to press the dome-shaped end back upon the shank, so as to finish the complete button-hook No. 4. The presser-bar *b*, fixed to the stock 14, and plunger *a*, fixed to the stock 15, are respectively reciprocated at the proper times by the cam S through the intervention of levers 12 and 13 and suitable connections, the cam S being keyed on a counter-shaft, T, driven from the main shaft O through bevel-gearing. On the completion of the button-hook and the retraction of the presser-bar *b* and the plunger *a*, the table A is again moved a quarter-turn. During this movement the former *g*, carrying the completed button-hook, is projected outwardly by the camway 16, so as to carry said button-hook beyond the exterior side of a fixed curved forked bar, W. The plate or former *g* enters the fork of bar W, and is retracted to its normal position during the next quarter-turn of the table A, causing the button-hook to be stripped from it by the said forked bar W. Other blanks No. 1 have been in the meanwhile successively fed onto the other plates *c* of table A and are in process of conversion into button-hooks. As the first plate *c* again arrives opposite way 6 a new blank No. 1 is pushed onto it, to be converted by the successive operations above described into a button-hook, and to be discharged.

It will thus be seen that the machinery above described is adapted to make button-hooks from a ribbon of metal by progressive steps, as follows: first, stamping a dome in the ribbon of metal; secondly, nearly contemporaneously therewith cutting a blank of the required form from said ribbon; thirdly, drawing up the prongs of the blank to form the fastening device; fourthly, bending the shank and dome into the shape represented by form No. 2; fifthly, transversely curving or corrugating the shank and bending it and the dome into the shape represented by form No. 3; sixthly, bending the dome back on the shank to complete the button-hook No. 4; seventhly, discharging the completed button-hook.

Having thus described my invention, what I claim is—

1. In a machine for making button-hooks, the combination, substantially as before set forth, of the former, the plunger holding the blank against one side thereof, and the plunger and fixed lip for bending the blank at a right angle past the end of said former, and also bending the dome back.

2. In a machine for making button-hooks, the combination, substantially as before set forth, of the former and the presser for bending the shank of the blank around the end of said former, and at the same time transversely curving the shank.

3. In a machine for making button-hooks, the combination, substantially as before set forth, of the former, the presser-bar for pressing the blank against one side of said former, and the plunger for bending the dome back upon the shank.

4. In a machine for making button-hooks, the combination, substantially as before set forth, of the rotating table, the reciprocating former, and the fixed forked stripper, whereby the finished button-hook is stripped from the said former.

5. In a machine for making button-hooks, the combination, substantially as before set forth, of an intermittingly-rotating table, the female die and plunger for drawing up the prongs of the blank, the former, the plunger for bending the blank at a right angle past the end of the former, the presser for bending the blank around the end of the former and transversely curving its shank, and the presser-bar and plunger for bending the dome back upon the shank.

LAURISTON TOWNE.

Witnesses:
WILLIAM HALKGARD,
JOSEPH A. MILLER, Jr.